United States Patent
Siana et al.

(10) Patent No.: US 12,412,406 B2
(45) Date of Patent: Sep. 9, 2025

(54) SYSTEM AND METHOD FOR CELL STATISTICS BASED ON IMAGE RECOGNITION

(71) Applicant: V5 TECHNOLOGIES CO., LTD., Hsinchu (TW)

(72) Inventors: Linda Siana, Hsinchu (TW); Guang-Hao Suen, Hsinchu (TW); Liang-Wei Sheu, Hsinchu (TW); Chien-Ting Yang, Hsinchu (TW)

(73) Assignee: V5MED INC., Zhubei (TW)

( * ) Notice: Subject to any disclaimer, the term of this patent is extended or adjusted under 35 U.S.C. 154(b) by 418 days.

(21) Appl. No.: 17/951,196

(22) Filed: Sep. 23, 2022

(65) Prior Publication Data
US 2024/0020994 A1 Jan. 18, 2024

(30) Foreign Application Priority Data
Jul. 12, 2022 (TW) .................................. 111126074

(51) Int. Cl.
*G06V 20/69* (2022.01)
*G02B 21/00* (2006.01)
(Continued)

(52) U.S. Cl.
CPC .......... *G06V 20/698* (2022.01); *G02B 21/008* (2013.01); *G02B 21/26* (2013.01);
(Continued)

(58) Field of Classification Search
CPC .... G06V 20/698; G06V 10/25; G06V 20/693; G06V 20/695; G02B 21/008;
(Continued)

(56) References Cited

U.S. PATENT DOCUMENTS

2014/0156223 A1* 6/2014 Toomre ............... G06F 30/20
702/179
2015/0133321 A1* 5/2015 Bhaumik ......... G01N 33/56977
506/9
(Continued)

FOREIGN PATENT DOCUMENTS

CN 107644421 A 1/2018
CN 108548767 A 9/2018
(Continued)

OTHER PUBLICATIONS

Jing et. al., "A novel spiral addressing scheme for rectangular images," 2015 14th IAPR International Conference on Machine Vision Applications (MVA), Tokyo, Japan, 2015, pp. 102-105, doi: 10.1109/MVA.2015.7153143. (Year: 2015).*

(Continued)

*Primary Examiner* — Chan S Park
*Assistant Examiner* — Chandhana Pedapati
(74) *Attorney, Agent, or Firm* — Birch, Stewart, Kolasch & Birch, LLP

(57) ABSTRACT

A system and a method for cell statistics based on image recognition is disclosed. A microscope captures the full image of a microslide, selects an interest region from the full image, and divides the region into sub-regions. A camera scans and transits the sub-regions to a host. The host performs image recognition on the scanned images to recognize various cells, and accumulates the number of the various cells in each of the scanned images to obtain a cell ratio of each type of the cells. When the number is accumulated and a difference among the cell ratios of the N consecutive scanned images is less than a preset value, the host stops scanning the remains of the sub-regions and outputs the cell ratio of each type of the presently-accumulated cells. The method can obtain various cell ratios of tissue samples for diagnosis.

13 Claims, 3 Drawing Sheets

(51) Int. Cl.
*G02B 21/26* (2006.01)
*G06V 10/25* (2022.01)

(52) U.S. Cl.
CPC ............ *G06V 10/25* (2022.01); *G06V 20/693* (2022.01); *G06V 20/695* (2022.01)

(58) Field of Classification Search
CPC ........ G02B 21/26; G02B 21/36; G01N 15/10; G01N 21/84; G01N 2015/1006; G01N 33/5044; G01N 15/1468; G05B 2219/33069; C12Y 304/21037
See application file for complete search history.

(56) References Cited

U.S. PATENT DOCUMENTS

2018/0032787 A1* 2/2018 Iga ........................... C12M 1/00
2018/0328848 A1* 11/2018 Murphy ........... G01N 33/57484
2019/0095692 A1* 3/2019 Nakatomi ............ G06V 20/698

FOREIGN PATENT DOCUMENTS

| | | | |
|---|---|---|---|
| CN | 111275016 A | 6/2020 | |
| CN | 112504947 A | 3/2021 | |
| CN | 112597852 A | 4/2021 | |
| CN | 112801212 A | 5/2021 | |
| CN | 113033389 A | 6/2021 | |
| CN | 113628201 A | 11/2021 | |
| CN | 114354489 A | 4/2022 | |
| CN | 114729922 A | 7/2022 | |
| KR | 10-2105489 B1 | 4/2020 | |
| WO | WO-2022178095 A1 * | 8/2022 | ............ G06N 20/00 |

OTHER PUBLICATIONS

Loewke NO, Pai S, Cordeiro C, Black D, King BL, Contag CH, Chen B, Baer TM, Solgaard O. Automated Cell Segmentation for Quantitative Phase Microscopy. IEEE Trans Med Imaging. Apr. 2018;37(4):929-940. doi: 10.1109/TMI.2017.2775604. PMID: 29610072; PMCID: PMC5907807. (Year: 2018).*

* cited by examiner

SYSTEM AND METHOD FOR CELL STATISTICS BASED ON IMAGE RECOGNITION

This application claims priority of Application No. 111126074 filed in Taiwan on 12 Jul. 2022 under 35 U.S.C. § 119; the entire contents of all of which are hereby incorporated by reference.

BACKGROUND OF THE INVENTION

Field of the Invention

The present invention relates to a method for calculating the number of cells, particularly to a system and a method for cell statistics based on image recognition.

Description of the Related Art

In cytology, cells are found and examined from fluid specimens, which place under a microscope slide. Cells detection solution captured image of the specimen at high magnification, then, the computer displays the captured image for inspection.

The 900-1600 images of each specimen (slide) will be captured with no overlapping area. In other words, the specimen should be divided into 900-1600 small blocks area, and an image of each block should be captured. In the present cells calculating method, cytologist manually selects an area of specimen, enlarge and count the cells one by one. However, the specimen includes more than one type of cells, and there may be thousands of cells of each type. Manual counting spends too much time. It is easy to recognize wrong cells when the eyes are tired.

To overcome the above mentioned problems, the present invention provides a system and a method for cell statistics based on image recognition, so as to solve the aforementioned problems of the prior art.

SUMMARY OF THE INVENTION

The primary objective of the present invention is to provide a system and a method for cell statistics based on image recognition, which divide a region of interest of microslide into sub-regions to recognize cells, calculate cell ratios, accumulate the number of cells in each sub-region until the cell ratio gradually converges, and rapidly calculate the cell ratio of each type of cells without scanning the complete region of interest.

Another objective of the present invention is to provide auto microslide region of interest selection, which magnify and scan a microslide to obtain a small full image and select a suitable region as a region of interest (ROI) based on image recognition. The ROI provides efficient area which contains cells which effective for calculating the number of cells, thereby obtaining a stable cell ratio.

In order to achieve the objectives, the present invention provides a method for cell statistics based on image recognition, which scans and recognizes a tissue solution under test on a microslide to calculate ratios of various cells. The method includes: capturing a full image of the microslide, selecting a region of interest from the full image, and dividing the region of interest into a plurality of sub-regions arranged into an array; sequentially scanning the plurality of sub-regions and transmitting scanned images of the plurality of sub-regions to a host for image recognition; by the host, performing image recognition on the scan images to recognize the various cells, accumulating number of the various cells in each of the scanned images to obtain total number of the various cells and a cell ratio of each type of the cells; and when the number of the various cells in each of the scanned images is accumulated and a difference among the cell ratios of the N consecutive scanned images is less than a preset value, stopping scanning remains of the plurality of sub-regions and outputting the cell ratio of each type of the presently-accumulated cells.

In an embodiment of the present invention, the microslide is placed on an electric stage, which is provided with a microscope and a camera thereon.

In an embodiment of the present invention, the microscope scans the microslide and then uses the camera to obtain the full image of the microslide after adjusting a magnification to four times (4×).

In an embodiment of the present invention, after the region of interest is magnified 40 times (40×), the plurality of sub-regions are divided and spirally scanned.

In an embodiment of the present invention, the central point of the plurality of sub-regions is used as a scanning starting point and the plurality of sub-regions are sequentially scanned from the scanning starting point along a spiral trajectory.

In an embodiment of the present invention, the spiral trajectory is clockwise or counterclockwise.

In an embodiment of the present invention, the cells comprise macrophages, lymphocytes, neutrophils, eosinophils, and mast cells.

The present invention also provides a system for cell statistics based on image recognition, which is configured to scan and recognize a tissue solution under test on a microslide to calculate ratios of various cells. The system includes an electric stage, a microscope, a camera, and a host. The microscope is mounted on the electric stage. The microscope is configured to capture a full image of the microslide, select a region of interest from the full image, divide the region of interest into a plurality of sub-regions arranged into an array, and sequentially scan the plurality of sub-regions. The camera is mounted on the lens of the microscope and configured to obtain scanned images of the plurality of sub-regions. The host is electrically connected to the camera and configured to receive the scanned images and recognize the various cells. The host is configured to accumulate the number of the various cells in each of the scanned images to obtain the total number of the various cells and a cell ratio of each type of the cells. When the number of the various cells in each of the scanned images is accumulated and a difference among the cell ratios of the N consecutive scanned images is less than a preset value, the host stops scanning remains of the plurality of sub-regions and outputs the cell ratio of each type of the presently-accumulated cells.

Below, the embodiments are described in detail in cooperation with the drawings to make easily understood the technical contents, characteristics and accomplishments of the present invention.

DETAILED DESCRIPTION OF THE INVENTION

The technical solutions in the embodiments of the present invention will be clearly and completely described below with reference to the drawings in the embodiments of the present invention. Obviously, the described embodiments are part of the embodiments of the present invention, not all of the embodiments. Based on the embodiments of the present invention, all other embodiments obtained by those skilled in the art without making inventive efforts should be included within the scope of the present invention.

It should be understood that, when used in this specification and the scope of the claims, the terms "comprising" and "including" refer to the presence of a stated feature, whole, step, operation, element, and/or component, but does not exclude the presence or addition of one or more other features, wholes, steps, operations, elements, components and/or combinations of these.

It should also be understood that the terms used in the specification of the present invention is only used to describe particular embodiments but not intended to limit the present invention. As used in this specification and the claims, the singular forms "a," "an," and "the" are intended to include the plural forms unless the context clearly dictates otherwise.

It should further be understood that the terms "and/or" used in the specification and the claims refer to any and all possible combinations of one or more of the associated listed items, and include these combinations.

Figure 1:
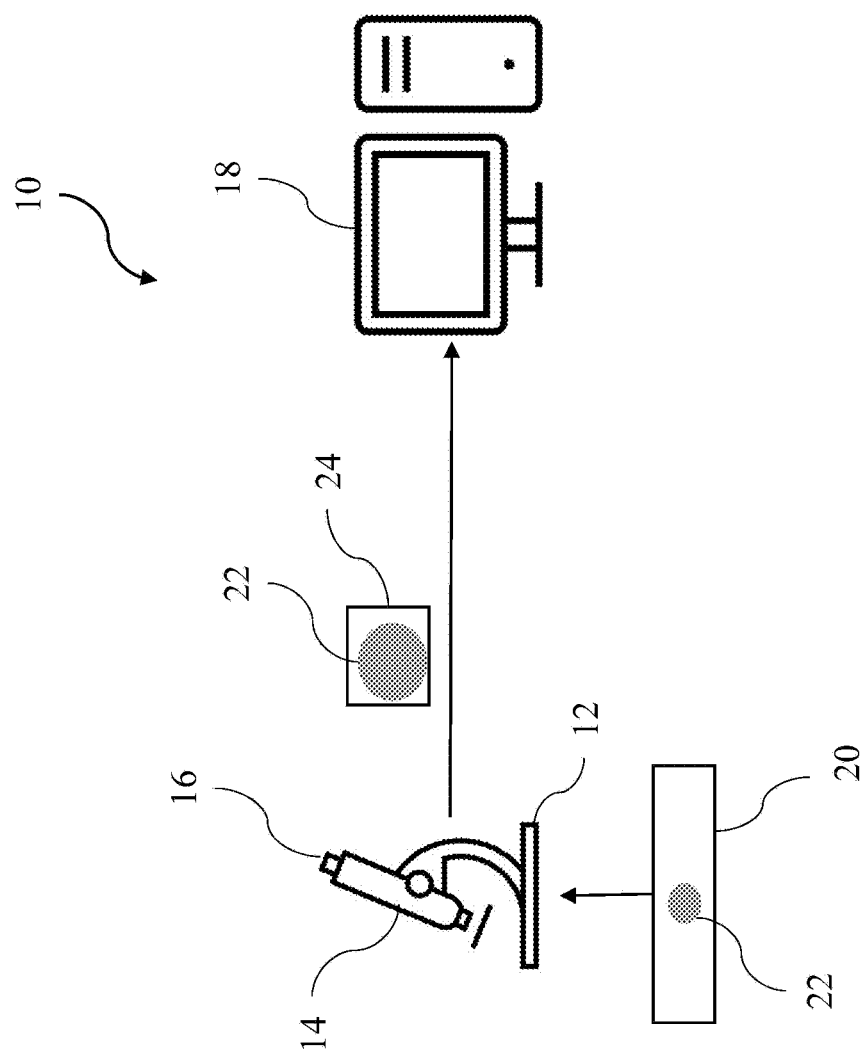
FIG. 1 is a schematic diagram illustrating a system for cell statistics based on image recognition according to an embodiment of the present invention.

The present invention provides a system and a method for cell statistics based on image recognition. Refer to FIG. 1. FIG. 1 is a schematic diagram illustrating a system 10 for cell statistics based on image recognition according to an embodiment of the present invention. The system 10 for cell statistics based on image recognition includes an electric stage 12, a microscope 14, a camera 16, and a host 18. The electric stage 12 can be controlled by a computer to move up and down, left and right, back and forth. The microscope 14 is mounted on the electric stage 12. The camera 16 is mounted on the lens of the microscope 14. The microscope 14 is provided with a microslide 20 thereon. A tissue solution 22 under test is on the microslide 20. The microscope 14 may be an electronic microscope. The microscope 14 magnifies the image of the tissue solution 22 under test. The camera 16 captures the image magnified by the microscope 14. The host 18 is electrically connected to the camera 16. The host 18 receives and performs image processing and artificial intelligence (AI) operation on the image captured by the camera 16.

Figure 2:
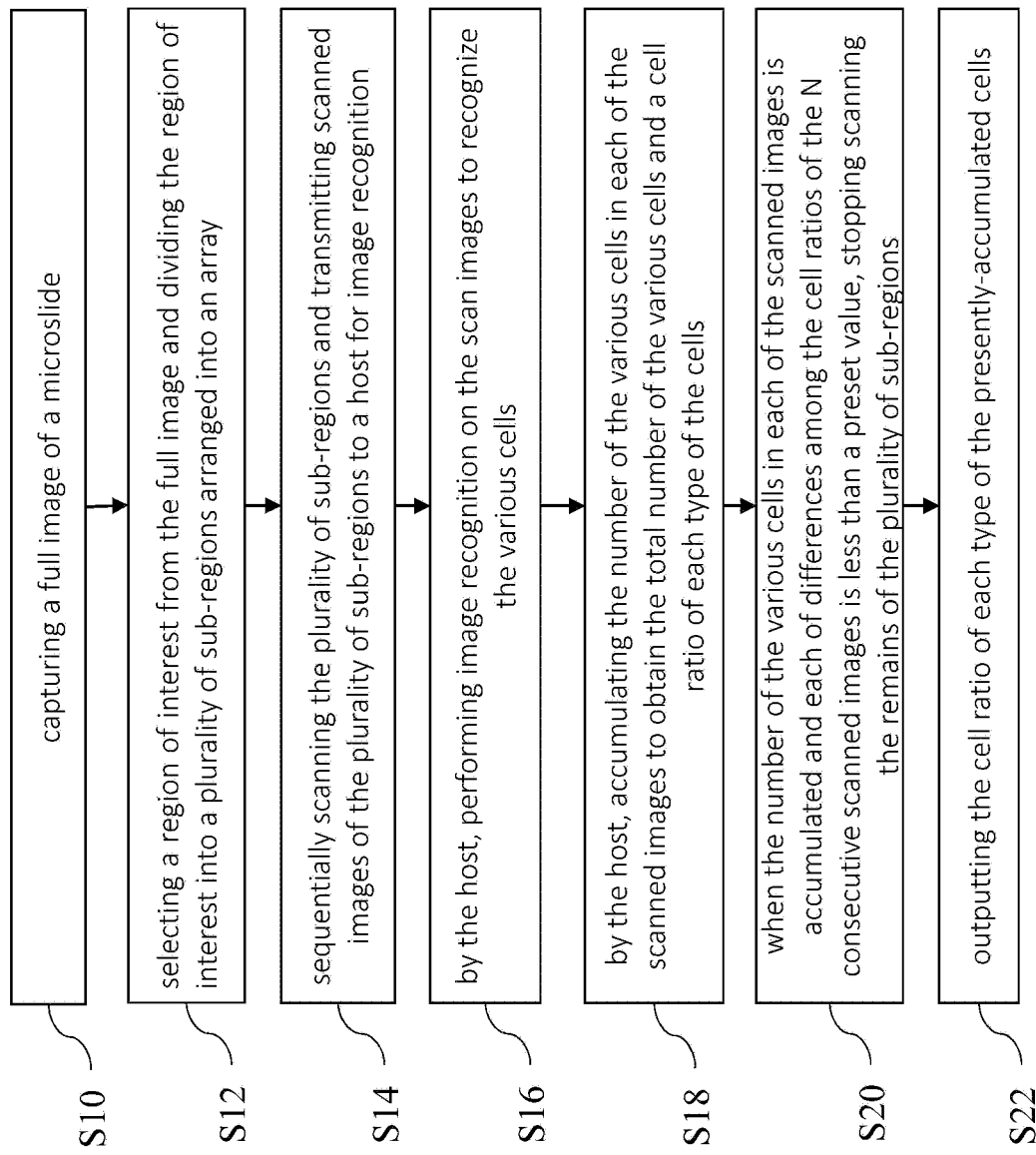
FIG. 2 is a flowchart of a method for cell statistics based on image recognition according to an embodiment of the present invention.

Referring to FIG. 2, the operation of the forgoing components is introduced as follows. FIG. 2 is a flowchart of a method for cell statistics based on image recognition according to an embodiment of the present invention. In Step S10, the microscope 14 captures a full image of the microslide 20. In a preferred embodiment, the microscope 14 scans the microslide 20 with a 4× magnification to obtain a smaller full image. In Step S12, a region 24 of interest is selected from the full image and the region 24 of interest is divided into a plurality of sub-regions arranged into an array. In Step S12, the region 24 of interest may be manually selected to include all the smallest regions of the tissue solution 22, and the region 24 of interest may be divided into the sub-regions by a computer. In Step S14, the microscope 14 scans the sub-regions in order set by the computer. The camera 16 captures the scanned image of each sub-region. The scanned images are transmitted to the host 18. In Step S16, the host 18 performs image recognition to recognize various cells in the scanned image when the host 18 receives one scanned image each time. In Step S18, the host 18 accumulates the number of the various cells in each of the scanned images to obtain the total number of the various cells and the cell ratio of each type of the cells. The host 18 recognizes the scanned image to determine the number of cells in the scanned image and the type of the cells, sums the number of each type of the cells, and updates the cell ratio of each type of the cells when the camera 16 scans and captures one scanned image each time. In Step S20, when the number of the various cells in each of the scanned images is accumulated and a difference or each of differences among the cell ratios of the N consecutive scanned images is less than a preset value, the microscope 14 and the camera 16 stops scanning the remains of the plurality of sub-regions and outputs the cell ratio of each type of the presently-accumulated cells in Step S22. For example, N=100 and each of differences among the cell ratios of the consecutive scanned images is less than 2%.

Since each scanned image contains more than one type of cells, the proportion of all types of cells may not vary by less than 2% after 100 consecutive scans, and the proportion of one or two types of cells may fluctuate greatly. Therefore, in step S20, a cell ratio may be preset as a reference, or the cell with the largest number may be directly used as a reference to determine whether the difference in cell ratio of consecutive N scanned images is smaller than a preset value.

In Step S12, the microscope 14 further magnifies the region of interest several times before a dividing process. For example, the region of interest is magnified 40 times (40×), so that the size of each sub-region is magnified. Thus, it is suitable for the host 18 to recognize cells in the magnified sub-region.

In Step S14, the sub-regions may be sequentially scanned along a spiral trajectory set by the computer. The central point of the sub-regions of the region 24 of interest is used as a scanning starting point. The sub-regions are sequentially spirally scanned from the scanning starting point in a clockwise or counterclockwise direction. Since the liquid has surface tension, the thickness of the tissue solution 22 under test is thickest in the central sub-region and the thickness of the tissue solution 22 under test in the peripheral sub-region is thinnest. In a spirally scanning manner, it is guarantee that the cell ratio of the peripheral sub-region is convergent.

Take Table 1 as an example. The tissue solution 22 includes macrophages, lymphocytes, neutrophils, eosinophils, and mast cells. If each of differences among the cell ratios of the N consecutive scanned images (e.g., N=100) is less than 2%, the cell ratio has converged. From Table 1, it is known that the total number of cells of the tissue solution 22 under test is 25961. Table 1 shows 4572 lymphocytes with a cell ratio of 17.61%, which represents that there is an inflammatory reaction at the detection site. Table 1 can be provided to doctors for auxiliary diagnosis.

TABLE 1

| Cell type | Cell ratio | Total number of single type of cells | Total number of all cells |
|---|---|---|---|
| Macrophage | 78.76% | 20446 | 25961 |
| Lymphocyte | 17.61% | 4572 | 25961 |

TABLE 1-continued

| Cell type | Cell ratio | Total number of single type of cells | Total number of all cells |
|---|---|---|---|
| Neutrophil | 3.19% | 828 | 25961 |
| Eosinophil | 0.44% | 115 | 25961 |
| Mast cell | 0.0% | 0 | 25961 |

Figure 3:
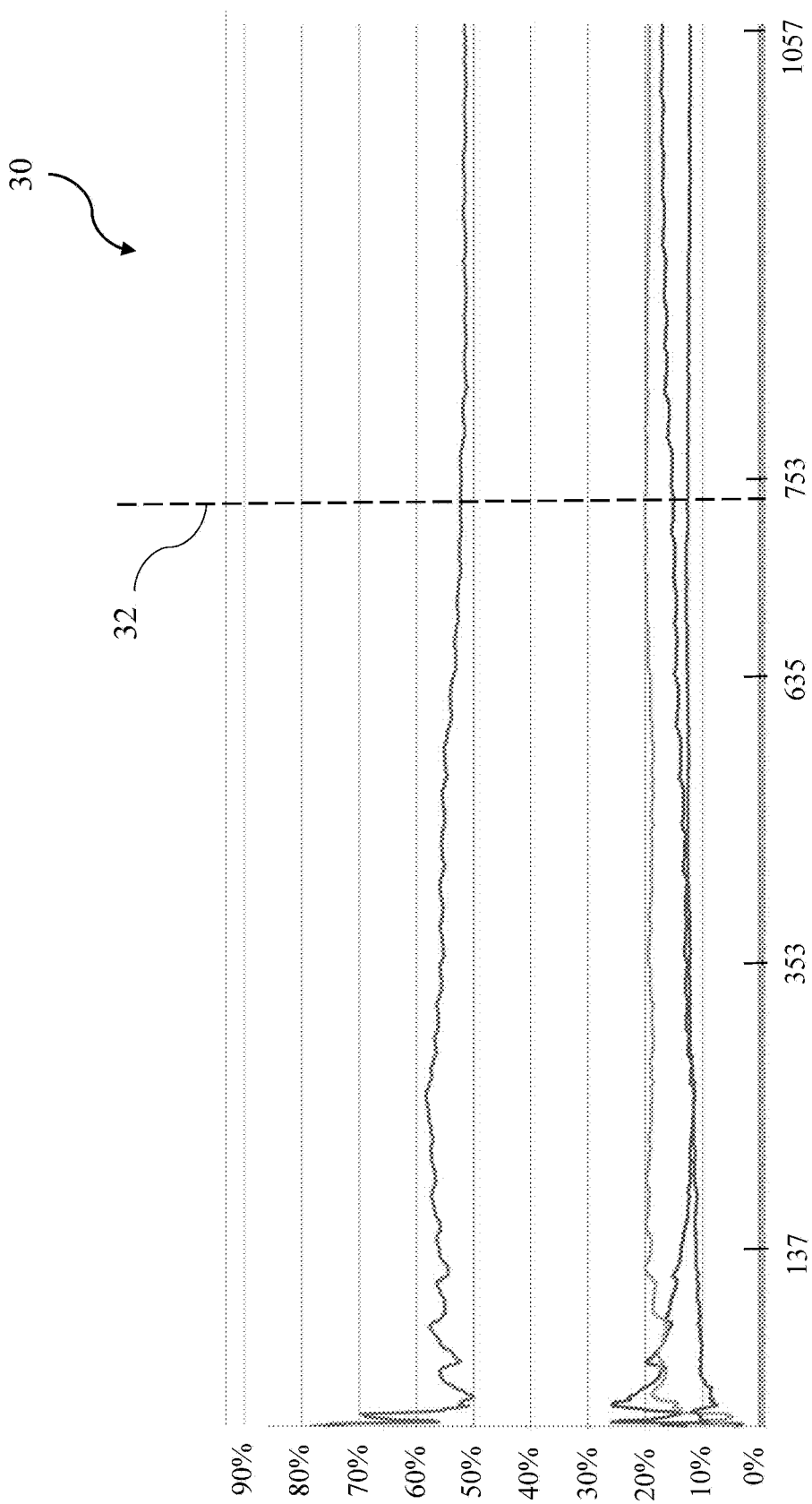
FIG. 3 is a diagram illustrating a curve of a host for accumulating the cell ratio of each type of cells according to an embodiment of the present invention.

FIG. 3 is a diagram illustrating a curve of a host for accumulating the cell ratio of each type of cells according to an embodiment of the present invention. Take Table 1 as an example. A diagram 30 illustrating the curves of cell ratios includes the curves of macrophage, lymphocyte, neutrophil, eosinophil, and mast cell. Since the total number of mast cells is 0, the curve of mast cell is a straight line that overlays the X axis. From FIG. 3, it can be seen that the region of interest of the tissue solution is divided into 1057 sub-regions. When the number of the scanned images is less than or equal to 100, the cell ratio greatly varies. This is because the scanned location is close to the central sub-region with the greatest thickness. When gradually scanning from the inside out to the periphery of the tissue solution under test, the curve of each type of cells no longer changes greatly. When the 635$^{th}$ scanned image is scanned, the host calculates the cell ratio of macrophage of 78.76%, the cell ratio of lymphocyte of 17.61%, the cell ratio of neutrophil of 3.19%, the cell ratio of eosinophil of 0.44%, and the cell ratio of mast cell of 0. Afterwards, the largest number in the total number of cells is macrophage, which used as a reference to determine the difference between the cell ratios. A difference or each of differences among the cell ratios of the 100 consecutive scanned images is less than 2% when the number of the various cells in each of the scanned images is accumulated. As a result, the cell ratio is convergent when the 735$^{th}$ scanned image is scanned. That is to say, the 735$^{th}$ scanned image is scanned at a convergent point 32. The 322 remaining sub-regions do not need to be scanned to retrieve their images.

In conclusion, the system and the method for cell statistics based on image recognition of the present invention magnify and scan a microslide to obtain a small full image for selecting a suitable region as a region of interest. It is convenient for the region of interest for calculating the number of cells, thereby obtaining a stable cell ratio. In addition, the system and the method divide a region of interest into sub-regions to recognize cells, calculate cell ratios, accumulate the number of cells in each sub-region until the cell ratio gradually converges, and rapidly calculate the cell ratio of each type of cells without scanning the remains of the region of interest.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for cell statistics based on image recognition, scanning and recognizing a tissue solution under test on a microslide to calculate ratios of various cells, and the method comprising:
    capturing a full image of the microslide, selecting a region of interest from the full image, and dividing the region of interest into a plurality of sub-regions arranged into an array;
    sequentially scanning the plurality of sub-regions and transmitting scanned images of the plurality of sub-regions to a host for image recognition;
    by the host, performing image recognition on the scan images to recognize the various cells, accumulating number of the various cells in each of the scanned images to obtain total number of the various cells and a cell ratio of each type of the cells; and
    when the number of the various cells in each of the scanned images is accumulated and a difference among the cell ratios of the N consecutive scanned images is less than a preset value, stopping scanning remains of the plurality of sub-regions and outputting the cell ratio of each type of the presently-accumulated cells, wherein N is a natural number greater than 1.

2. The method for cell statistics based on image recognition according to claim 1, wherein the microslide is placed on an electric stage, which is provided with a microscope and a camera thereon.

3. The method for cell statistics based on image recognition according to claim 2, wherein the microscope scans the microslide and then uses the camera to obtain the full image of the microslide after adjusting a magnification to four times.

4. The method for cell statistics based on image recognition according to claim 1, wherein after the region of interest is magnified 40 times, the plurality of sub-regions are divided and spirally scanned.

5. The method for cell statistics based on image recognition according to claim 1, wherein a central point of the plurality of sub-regions is used as a scanning starting point and the plurality of sub-regions are sequentially scanned from the scanning starting point along a spiral trajectory.

6. The method for cell statistics based on image recognition according to claim 5, wherein a direction of the spiral trajectory is clockwise or counterclockwise.

7. The method for cell statistics based on image recognition according to claim 1, wherein the cells comprise macrophages, lymphocytes, neutrophils, eosinophils, and mast cells.

8. A system for cell statistics based on image recognition, configured to scan and recognize a tissue solution under test on a microslide to calculate ratios of various cells, comprising:
    an electric stage;
    a microscope mounted on the electric stage, wherein the microscope is configured to capture a full image of the microslide, select a region of interest from the full image, divide the region of interest into a plurality of sub-regions arranged into an array, and sequentially scan the plurality of sub-regions;
    a camera mounted on a lens of the microscope and configured to obtain scanned images of the plurality of sub-regions; and
    a host electrically connected to the camera and configured to receive the scanned images and recognize the various cells, wherein the host is configured to accumulate number of the various cells in each of the scanned images to obtain total number of the various cells and a cell ratio of each type of the cells, and when the number of the various cells in each of the scanned images is accumulated and a difference among the cell ratios of the N consecutive scanned images is less than a preset value, the host stops scanning remains of the plurality of sub-regions and outputs the cell ratio of each type of the presently-accumulated cells, wherein N is a natural number greater than 1.

9. The system for cell statistics based on image recognition according to claim 8, wherein the microscope scans the microslide and then uses the camera to obtain the full image of the microslide after adjusting a magnification to four times.

10. The system for cell statistics based on image recognition according to claim 8, wherein after the region of interest is magnified 40 times, the plurality of sub-regions are divided and spirally scanned.

11. The system for cell statistics based on image recognition according to claim 8, wherein the camera uses a central point of the plurality of sub-regions as a scanning starting point and sequentially scans the plurality of sub-regions from the scanning starting point along a spiral trajectory.

12. The system for cell statistics based on image recognition according to claim 11, wherein a direction of the spiral trajectory is clockwise or counterclockwise.

13. The system for cell statistics based on image recognition according to claim 8, wherein the cells comprise macrophages, lymphocytes, neutrophils, eosinophils, and mast cells.

\* \* \* \* \*